United States Patent
Inoue (10) Patent No.: US 8,493,567 B2
(45) Date of Patent: Jul. 23, 2013

(54) OPTICAL TOMOGRAPHIC IMAGE ACQUISITION APPARATUS AND METHOD OF ACQUIRING OPTICAL TOMOGRAPHIC IMAGE WHICH ADJUSTS REFERENCE POSITION THAT ACQUIRES OPTICAL TOMOGRAPHIC IMAGE BASED ON SHEATH INTERFERENCE SIGNAL

(75) Inventor: Toshiyuki Inoue, Kanagawa (JP)

(73) Assignee: Terumo Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/564,721

(22) Filed: Sep. 22, 2009

(65) Prior Publication Data

US 2010/0073682 A1 Mar. 25, 2010

(30) Foreign Application Priority Data

Sep. 25, 2008 (JP) .................................. 2008-246309

(51) Int. Cl.
*G01B 9/02* (2006.01)
*G01B 11/02* (2006.01)

(52) U.S. Cl.
USPC .......................................... 356/479; 356/497

(58) Field of Classification Search
USPC ................................. 356/479, 497
See application file for complete search history.

(56) References Cited

U.S. PATENT DOCUMENTS

| 7,589,842 B2 | 9/2009 | Kuroiwa |
| 2005/0168751 A1 | 8/2005 | Horii et al. |
| 2008/0079949 A1 | 4/2008 | Kuroiwa |
| 2008/0228033 A1* | 9/2008 | Tumlinson et al. ........... 600/112 |

FOREIGN PATENT DOCUMENTS

| JP | 2000-097846 A | 4/2000 |
| JP | 2008-86414 | 4/2008 |
| WO | WO 2008/044539 A1 | 4/2008 |

* cited by examiner

*Primary Examiner* — Hwa Lee
(74) *Attorney, Agent, or Firm* — McGinn Intellectual Property Law Group (57) ABSTRACT

An optical tomographic image acquisition apparatus comprises a light source unit emitting light; a light dividing device dividing the light from the unit into measurement light and reference light; a projecting device arranged inside a tubular sheath to project the measurement light onto an object; a combining device combining reflected light reflected from the object or the sheath and the reference light; an interference light detecting device detecting interference light between the reflected light and the reference light; an interference signal acquiring device acquiring an interference signal; a tomographic image acquiring device acquiring an optical tomographic image; and a reference position adjustment section detecting a sheath interference signal that is an interference signal of the reflected light reflected from the sheath from the interference signals and adjusts an optical tomographic image reference position as a reference to acquire the optical tomographic image based on the detected sheath interference signal.

4 Claims, 5 Drawing Sheets

OPTICAL TOMOGRAPHIC IMAGE ACQUISITION APPARATUS AND METHOD OF ACQUIRING OPTICAL TOMOGRAPHIC IMAGE WHICH ADJUSTS REFERENCE POSITION THAT ACQUIRES OPTICAL TOMOGRAPHIC IMAGE BASED ON SHEATH INTERFERENCE SIGNAL

BACKGROUND OF THE INVENTION

1. Field of the Invention

The present invention relates to an optical tomographic image acquisition apparatus and a method of acquiring an optical tomographic image, and more particularly, to a technique for adjusting a reference position to acquire an optical tomographic image.

2. Description of the Related Art

Japanese Patent Application Laid-Open No. 2008-86414 discloses a technique for adjusting the optical path length of reference light by moving a reflection mirror of an optical path length changing device such that the optical path length of measurement light and reflected light matches that of the reference light at a window incident point of an optical probe as a reference point.

SUMMARY OF THE INVENTION

In the technique disclosed in Japanese Patent Application Laid-Open No. 2008-86414, however, an interference signal may be obtained at an optical lens system or the like within the optical probe other than an interference signal at the window incident point of the optical probe, and the window incident point of the optical probe as the reference point may not be detected depending on the intensity of the interference signal. Thus, an optical tomographic image reference position as a reference to acquire an optical tomographic image may not be appropriately set.

The present invention has been made in view of such circumstances, and it is an object of the present invention to provide an optical tomographic image acquisition apparatus and a method of acquiring an optical tomographic image, which can appropriately set an optical tomographic image reference position as a reference to acquire an optical tomographic image.

In order to achieve the above object, an optical tomographic image acquisition apparatus according to a first aspect of the present invention is an optical tomographic image acquisition apparatus including: a light source unit which emits light; a light dividing device which divides the light emitted from the light source unit into measurement light and reference light; a projecting device which is arranged inside a tubular sheath having translucency to project the measurement light divided by the light dividing device onto an object to be measured outside the sheath; a combining device which combines reflected light reflected from the object to be measured or the sheath and the reference light; an interference light detecting device which detects interference light between the reflected light and the reference light combined by the combining device; an interference signal acquiring device which acquires an interference signal at each frequency by performing frequency analysis on the interference light detected by the interference light detecting device; a tomographic image acquiring device which acquires an optical tomographic image at each scanning position of the object to be measured based on the interference signals acquired by the interference signal acquiring device; and a reference position adjustment section which detects a sheath interference signal that is an interference signal of the reflected light reflected from the sheath from the interference signals acquired by the interference signal acquiring device and adjusts an optical tomographic image reference position as a reference to acquire the optical tomographic image based on the detected sheath interference signal.

With the present invention, since the optical tomographic image reference position is adjusted based on the detected sheath interference signal, the optical tomographic image reference position can be appropriately adjusted.

In order to achieve the above object, an optical tomographic image acquisition apparatus according to a second aspect of the present invention is the optical tomographic image acquisition apparatus according to the first aspect, wherein the sheath interference signal includes a sheath inner peripheral surface interference signal that is an interference signal of reflected light reflected from an inner peripheral surface of the sheath and a sheath outer peripheral surface interference signal that is an interference signal of reflected light reflected from an outer peripheral surface of the sheath, and the reference position adjustment section detects an intensity of the sheath inner peripheral surface interference signal, an intensity of the sheath outer peripheral surface interference signal, and an interval between a frequency of the interference light when the sheath inner peripheral surface interference signal is detected and a frequency of the interference light when the sheath outer peripheral surface interference signal is detected, to detect the sheath interference signal from the interference signals.

With the present invention, the sheath interference signal can be reliably detected, and the optical tomographic image reference position can be appropriately adjusted based on the sheath interference signal.

In order to achieve the above object, an optical tomographic image acquisition apparatus according to a third aspect of the present invention is the optical tomographic image acquisition apparatus according to the first or second aspect, further including an optical path length changing device which changes an optical path length of the reference light by moving a reflection member which reflects the reference light, wherein the reference position adjustment section shifts the frequency of the interference light when the sheath inner peripheral surface interference signal is detected and the frequency of the interference light when the sheath outer peripheral surface interference signal is detected in one direction by moving the reflection member in one direction, to detect the sheath interference signal from the interference signals.

With the present invention, the sheath interference signal can be more reliably detected, and the optical tomographic image reference position can be appropriately adjusted based on the sheath interference signal.

In order to achieve the above object, an optical tomographic image acquisition apparatus according to a fourth aspect of the present invention is the optical tomographic image acquisition apparatus according to the third aspect, further including a storage device which stores the sheath interference signal frequency detected by the reference position adjustment section, wherein the reference position adjustment section determines an initial position of the reflection member based on the sheath interference signal frequency previously detected and stored in the storage device.

With the present invention, the sheath interference signal can be more quickly and reliably detected.

In order to achieve the above object, an optical tomographic image acquisition apparatus according to a fifth aspect of the present invention is the optical tomographic image acquisition apparatus according to any one of the second to fourth aspects, further including a frequency setting device which can set the frequency of the interference light when the sheath outer peripheral surface interference signal is detected to a predetermined value.

With the present invention, the optical tomographic image reference position can be freely set.

In order to achieve the above object, an optical tomographic image acquisition apparatus according to a sixth aspect of the present invention is the optical tomographic image acquisition apparatus according to any one of the second to fifth aspects, wherein the reference position adjustment section adjusts the optical tomographic image reference position such that the frequency of the interference light when the sheath outer peripheral surface interference signal is detected is 3 MHz to 8 MHz.

In order to achieve the above object, an optical tomographic image acquisition apparatus according to a seventh aspect of the present invention is the optical tomographic image acquisition apparatus according to any one of the second to fifth aspects, wherein the reference position adjustment section adjusts the optical tomographic image reference position such that the frequency of the interference light when the sheath outer peripheral surface interference signal is detected is 15 MHz to 20 MHz.

In order to achieve the above object, a method of acquiring an optical tomographic image according to an eighth aspect of the present invention is a method of acquiring an optical tomographic image including the steps of: dividing light emitted from a light source unit into measurement light and reference light; projecting the measurement light onto an object to be measured outside a tubular sheath having translucency by a projecting device arranged inside the sheath; combining reflected light reflected from the object to be measured or the sheath and the reference light; detecting interference light between the combined reflected light and reference light; acquiring an interference signal at each frequency by performing frequency analysis on the detected interference light; and acquiring an optical tomographic image at each scanning position of the object to be measured based on the acquired interference signals; the method further including the steps of: detecting a sheath interference signal that is an interference signal of the reflected light reflected from the sheath from the acquired interference signals and adjusting an optical tomographic image reference position as a reference to acquire the optical tomographic image based on the detected sheath interference signal.

With the present invention, the optical tomographic image reference position as the reference to acquire the optical tomographic image can be appropriately set.

DETAILED DESCRIPTION OF THE PREFERRED EMBODIMENT(S)

In the following, a preferred embodiment of the present invention will be described in detail with reference to the accompanying drawings.

[Description of Optical Tomographic Image Acquisition Apparatus]

Figure 1:
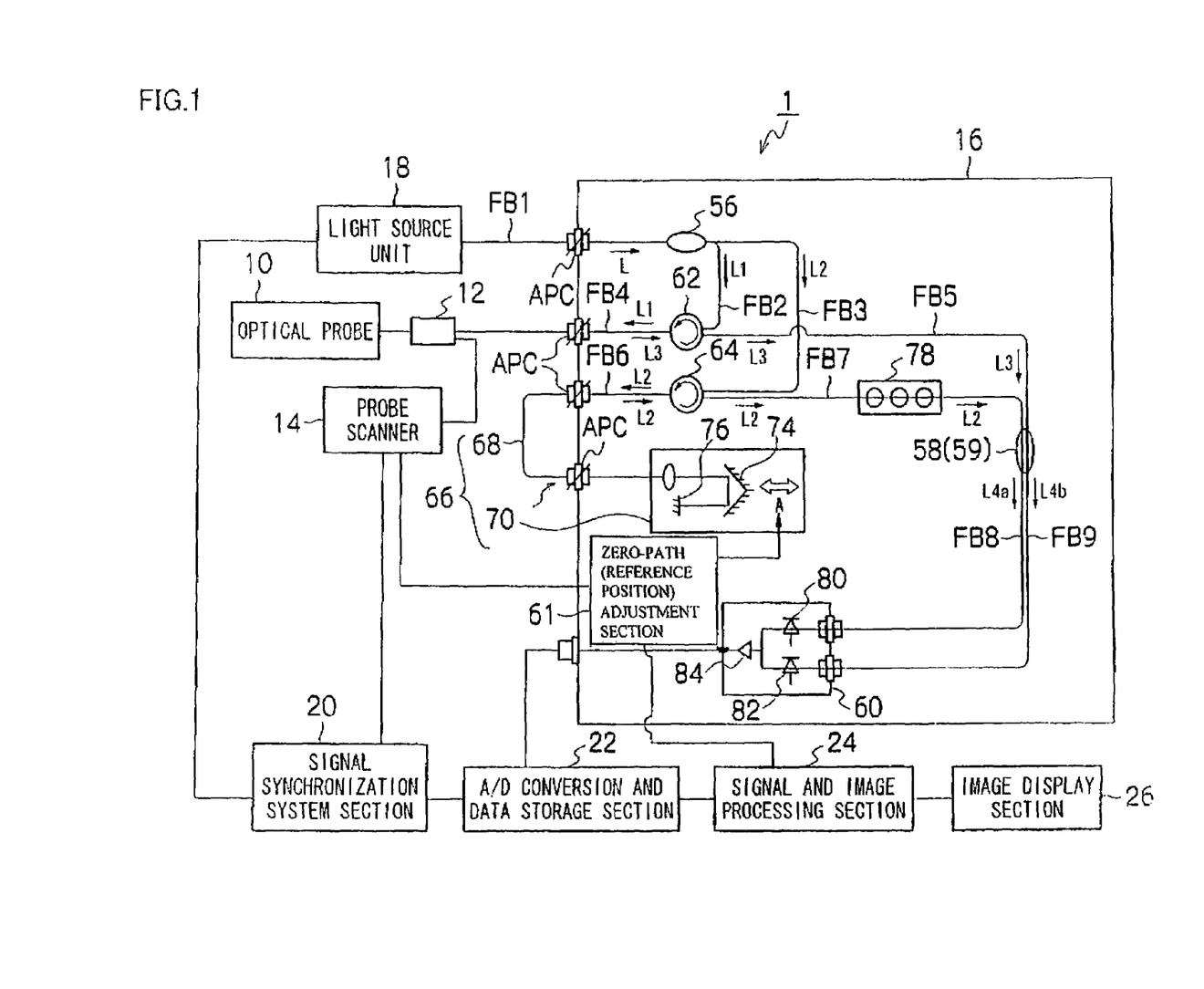
FIG. 1 is a system block diagram of an optical tomographic image acquisition apparatus according to the present invention.

FIG. 1 is a system block diagram of an optical tomographic image acquisition apparatus according to the present invention. An optical tomographic image acquisition apparatus 1 acquires a tomographic image of an object to be measured S such as living tissue and cells inside a body cavity by SS-OCT (swept source OCT) measurement by inserting an optical probe 10 into the body cavity. Although the tomographic image is acquired by the SS-OCT measurement in the present embodiment, the tomographic image may be also acquired by another method such as SD-OCT (spectral domain OCT) measurement.

The optical tomographic image acquisition apparatus 1 includes the optical probe 10, a rotary adapter 12, a probe scanner 14, an interferometer 16, a light source unit 18, a signal synchronization system section 20, an A/D conversion and data storage section 22, a signal and image processing section 24, and an image display section 26.

Figure 2:
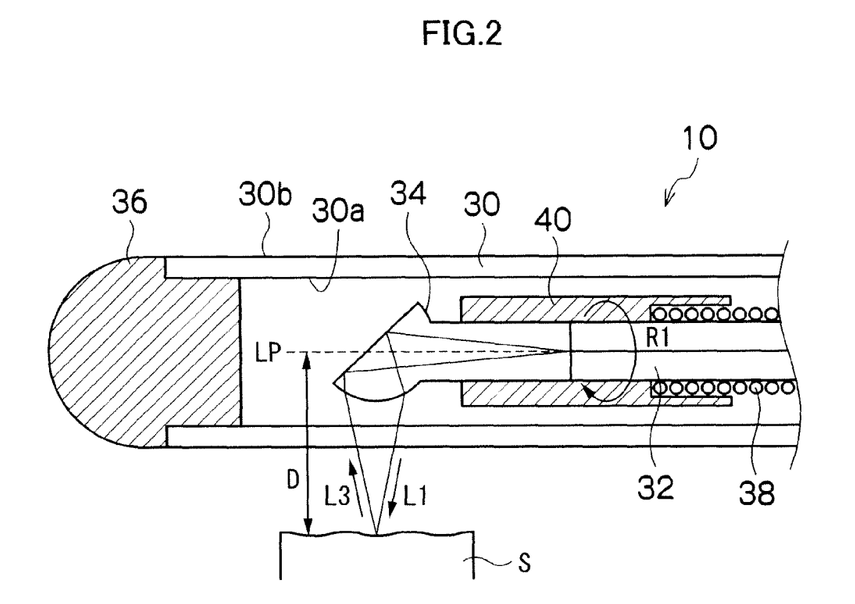
FIG. 2 is a schematic view illustrating an example of a distal end portion of an optical probe shown in FIG. 1.

FIG. 2 is a schematic view illustrating an example of the distal end portion of the optical probe 10 shown in FIG. 1. The optical probe 10 in FIG. 2 is inserted into a body cavity through a forceps port, for example. The optical probe 10 includes a sheath (a probe outer tube) 30, an optical fiber 32, and an optical lens 34. The sheath 30 is a tubular member having flexibility, and is made of material through which measurement light L1 and reflected light L3 are transmitted. The distal end of the sheath 30 is closed by a cap 36.

The optical fiber 32 guides to the object to be measured S the measurement light L1 emitted from the interferometer 16, and guides to the interferometer 16 the reflected light (backscattered light) L3 from the object to be measured S obtained by projecting the measurement light L1 onto the object to be measured S. The optical fiber 32 is housed in the sheath 30.

A spring 38 is fixed to the outer periphery of the optical fiber 32. The optical fiber 32 and the spring 38 are mechanically connected to the rotary adapter 12. The optical fiber 32 and the spring 38 are rotated in the direction of an arrow R1 relative to the sheath 30 by the rotary adapter 12.

The optical lens 34 has a substantially spherical shape to collect the measurement light L1 emitted from the optical fiber 32 onto the object to be measured S. The optical lens 34 also collects the reflected light L3 from the object to be measured S and causes the collected reflected light L3 to enter the optical fiber 32. The focal point of the optical lens 34 is formed at a position apart a distance D from an optical axis LP of the optical fiber 32 in the radial direction of the probe outer tube.

The optical lens 34 is fixed to a light emission end portion of the optical fiber 32 by a fixing member 40. When the optical fiber 32 is rotated in the arrow R1 direction, the optical lens 34 is also integrally rotated in the arrow R1 direction. Accordingly, the optical probe 10 projects the measurement light L1 emitted from the optical lens 34 onto the object to be measured S while performing scanning in the arrow R1 direction (the circumferential direction of the sheath 30).

The operation of the rotary adapter 12 in FIG. 1 which rotates the optical fiber 32 and the optical lens 34 is controlled by the probe scanner 14. The probe scanner 14 controls the rotary adapter 12 to rotate in the arrow R1 direction relative to the sheath 30. When determining that the optical fiber 32 is rotated one revolution based on a frame signal from a rotary encoder (not shown) of the rotary adapter 12, the probe scanner 14 outputs a rotation clock signal to the signal synchronization system section 20.

Figure 3:
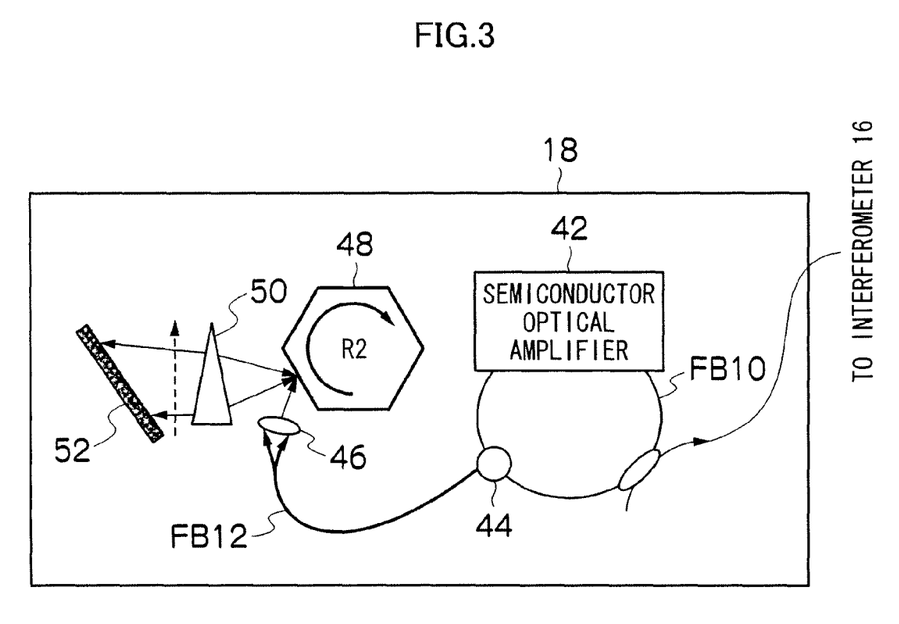
FIG. 3 is a schematic view illustrating an example of a light source unit.

FIG. 3 is a schematic view illustrating an example of the light source unit 18. The light source unit 18 emits laser light L while sweeping the wavelength at a constant period. To be more specific, the light source unit 18 includes a semiconductor optical amplifier (a semiconductor gain medium) 42, and an optical fiber FB10. The optical fiber FB10 is connected to the both ends of the semiconductor optical amplifier 42.

The semiconductor optical amplifier 42 has a function of emitting faint emission light to one end of the optical fiber FB10 when a drive current is applied thereto, and amplifying the light entering from the other end of the optical fiber FB10. When the drive current is applied to the semiconductor optical amplifier 42, an optical resonator is formed by the semiconductor optical amplifier 42 and the optical fiber FB10, and the laser light L is thereby emitted to the optical fiber FB10.

A circulator 44 is also connected to the optical fiber FB10. The light guided through the optical fiber FB10 is partially emitted from the circulator 44 into an optical fiber FB12. The light emitted from the optical fiber FB12 is reflected by a collimator lens 46 and a rotating polygon mirror 48 and reaches a diffraction grating element 52 via an optical system 50. The light is dispersed by the diffraction grating element 52, and is reflected again by the rotating polygon mirror 48 via the optical system 50. The light reflected by the rotating polygon mirror 48 enters the optical fiber FB12 again.

The rotating polygon mirror 48 rotates in the direction of an arrow R2. The angle of each reflection plane is thereby varied with respect to the optical axis of the optical system 50. Accordingly, only the light within a specific wavelength band out of the light dispersed by the diffraction grating element 52 returns to the optical fiber FB12. The wavelength of the light returning to the optical fiber FB12 is determined by the angle formed between the optical axis of the optical system 50 and the reflection plane. The light having a specific wavelength entering the optical fiber FB12 enters the optical fiber FB10 from the circulator 44, and the laser light L having the specific wavelength is emitted into the optical fiber FB1.

Figure 4:
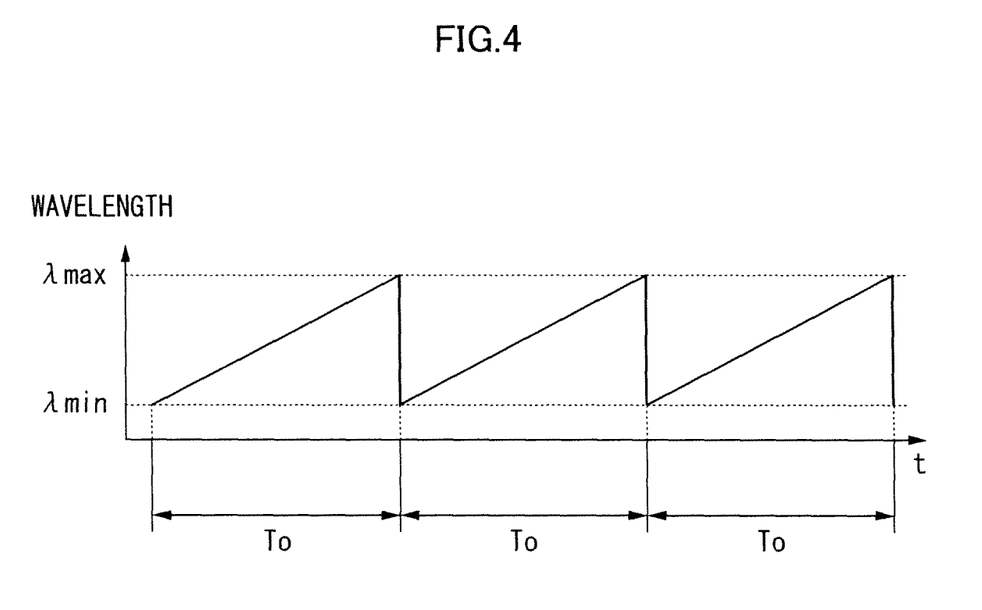
FIG. 4 is a graph illustrating a state in which the wavelength of light emitted from the light source unit in FIG. 3 is swept.

Accordingly, when the rotating polygon mirror 48 rotates at a constant speed in the arrow R2 direction, the wavelength λ of the light entering the optical fiber FB10 again is varied at a constant period with time. To be more specific, as shown in FIG. 4, the light source unit 18 emits the light L whose wavelength is swept at a constant period T0 (for example, about 50 μsec) from a minimum sweep wavelength λmin to a maximum sweep wavelength λmax. The light L emitted from the light source unit 18 enters the interferometer 16.

Although the case of sweeping the wavelength by rotating the polygon mirror is described as the light source unit 18, the light L may be also emitted while sweeping the wavelength at a constant period by using a known technique such as an ASE light source unit.

The interferometer 16 shown in FIG. 1 is a Mach-Zehnder interferometer, and is formed with various optical components being housed in a housing. The interferometer 16 includes a light dividing device 56 which divides the light L emitted from the light source unit 18 into the measurement light L1 and reference light L2, a combining device 58 which combines the reflected light L3 from the object to be measured S obtained by projecting the measurement light L1 divided by the light dividing device 56 onto the object to be measured S, and the reference light L2, an interference signal acquiring device 60 which acquires an interference signal by detecting interference light L4 between the reflected light L3 and the reference light L2 combined by the combining device 58, and a zero-path adjustment section 61 which adjusts an optical tomographic image reference position as a reference to acquire an optical tomographic image described later.

The interferometer 16 and the light source unit 18 are connected to each other by using an APC (angled physical contact) connector. By using the APC connector, returning light reflected from the connection end surface of the optical connector (the optical fiber) is reduced to a maximum extent, and image degradation of a tomographic image P can be prevented.

The light dividing device 56 has a 2×2 optical fiber coupler, for example. The light dividing device 56 divides the light L guided through the optical fiber FB1 from the light source unit 18 into the measurement light L1 and the reference light L2. Here, the light dividing device 56 divides the light L such that the ratio of the measurement light L1 to the reference light L2 is 99:1, for example. Two optical fibers FB2 and FB3 are respectively optically connected to the light dividing device 56. The divided measurement light L1 enters the optical fiber FB2, and the reference light L2 enters the optical fiber FB3.

An optical circulator 62 is connected to the optical fiber FB2. Optical fibers FB4 and FB5 are respectively connected to the optical circulator 62. The optical probe 10 which guides the measurement light L1 to the object to be measured S is connected to the optical fiber FB4. The measurement light L1 emitted from the optical circulator 62 is guided to the optical probe 10 through the optical fiber FB4 and is projected onto the object to be measured S.

The reflected light L3 reflected from the object to be measured S enters the optical circulator 62 via the optical fiber FB4 and is emitted into the optical fiber FB5 from the optical circulator 62. The optical fiber FB4 and the optical probe 10 are connected to each other by an APC (angled physical contact) connector. Returning light reflected from the connection end surface of the optical connector (the optical fiber) is thereby reduced to a maximum extent, and the image degradation of the tomographic image P can be prevented.

Meanwhile, an optical circulator 64 is connected to the optical fiber FB3. Optical fibers FB6 and FB7 are respectively connected to the optical circulator 64. An optical path length adjustment device 66 which changes the optical path length of the reference light L2 to adjust an acquisition area of the tomographic image is connected to the optical fiber FB6. The optical path length adjustment device 66 includes an optical path length coarse adjustment optical fiber 68 which coarsely adjusts the optical path length, and an optical path length fine adjustment device 70 which finely adjusts the optical path length.

One end of the optical path length coarse adjustment optical fiber 68 is detachably connected to the optical fiber FB6. The other end thereof is detachably connected to the optical path length fine adjustment device 70. A plurality of optical path length coarse adjustment optical fibers having various lengths are prepared in advance as the optical path length coarse adjustment optical fiber 68. One of the optical path length coarse adjustment optical fibers 68 having an appropriate length is connected as needed.

The optical path length coarse adjustment optical fiber 68 is connected to the optical fiber FB6 and the optical path length fine adjustment device 70 by APC (angled physical contact) connectors. Returning light reflected from the connection end surface of the optical connector (the optical fiber) is thereby reduced to a maximum extent, and the image degradation of the tomographic image P can be prevented.

The optical path length fine adjustment device 70 includes a collimator lens 72, a reflection mirror 74, and an optical terminator 76. The reflection mirror 74 reflects the reference light L2 emitted from the optical path length coarse adjustment optical fiber 68 toward the optical terminator 76, and reflects the reference light L2 reflected from the optical terminator 76 toward the optical path length coarse adjustment optical fiber 68 again.

The reflection mirror 74 is fixed on a movable stage (not shown), and is moved by a mirror moving device in the optical axis direction of the reference light L2 (the direction of an arrow A), thereby changing the optical path length of the reference light L2. A doctor or the like operates an operation section (not shown) to allow the movable stage to move the reflection mirror 74 in the arrow A direction.

A polarization controller 78 is optically connected to the optical fiber FB7. The polarization controller 78 can rotate the polarization direction of the reference light L2.

The polarization controller 78 adjusts the polarization direction by being operated by a doctor or the like. For example, by operating the polarization controller 78 such that the polarization direction of the reference light L2 corresponds to that of the reflected light L3 when the reference light L2 and the reflected light L3 are combined in the combining device 58, the tomographic image can be adjusted to be clear.

The combining device 58 has a 2×2 optical fiber coupler. The combining device 58 combines the reflected light L3 guided through the optical fiber FB5 and the reference light L2 guided through the optical fiber FB7. To be more specific, the combining device 58 branches the reflected light L3 guided through the optical fiber FB5 into two optical fibers FB8 and FB9, and the reference light L2 guided through the optical fiber FB7 into the optical fibers FB8 and FB9.

Accordingly, the reflected light L3 and the reference light L2 are combined respectively in the optical fibers FB8 and FB9. First interference light L4a is guided through the optical fiber FB8, and second interference light L4b is guided through the optical fiber FB9. That is, the combining device 58 also functions as a light branching device 59 which branches the interference light L4 between the reflected light L3 and the reference light L2 into the interference light L4a and the interference light L4b.

The interference signal acquiring device 60 includes a first light detection section 80 which detects the first interference light L4a, a second light detection section 82 which detects the second interference light L4b, and a difference amplifier 84 which outputs a difference between the first interference light L4a detected by the first light detection section 80 and the second interference light L4b detected by the second light detection section 82 as an interference signal.

Each of the light detection sections 80 and 82 has a photodiode or the like. The light detection sections 80 and 82 photoelectrically convert and input the incident interference light L4a and interference light L4b to the difference amplifier 84, respectively. The difference amplifier 84 amplifies the difference between the interference light L4a and interference light L4b and outputs the difference as the interference signal.

As described above, the interference light L4a and interference light L4b are detected by balanced detection by the difference amplifier 84. Accordingly, in-phase light noise other than the interference signal can be eliminated while amplifying and outputting the interference signal, and the image quality of the tomographic image P can be thereby improved.

An A/D conversion and data storage section 22 is located in the downstream of the difference amplifier 84 of the interference signal acquiring device 60. The A/D conversion and data storage section 22 is connected to the zero-path adjustment section 61 via a signal and image processing section 24. The zero-path adjustment section 61 is connected not only to the signal and image processing section 24 but also to the movable stage which moves the reflection mirror 74 of the optical path length adjustment device 70 and the probe scanner 14. The zero-path adjustment section 61 controls the optical path length adjustment device 70 so that a frequency of an interference signal which is outputted from the interference signal acquiring device 60, subjected to A/D conversion, and then subjected to signal processing on the signal and image processing section 24 becomes a predetermined frequency.

An operation example of the optical tomographic image acquisition apparatus 1 will be described with reference to FIGS. 1 to 4. First, the light source unit 18 emits a light flux whose wavelength is swept at a constant period within a predetermined wavelength band. The light L enters the interferometer 16. The light L is divided into the measurement light L1 and the reference light L2 by the light dividing device 56 of the interferometer 16. The measurement light L1 is emitted into the optical fiber FB2, and the reference light L2 is emitted into the optical fiber FB3.

The measurement light L1 is guided through the optical circulator 62, the optical fiber FB4 and the optical probe 10 to be projected onto the object to be measured S. The reflected light L3 reflected from each depth position z of the object to be measured S and backscattered light enter the optical probe 10 again. The reflected light L3 enters the combining device 58 through the optical probe 10, the optical circulator 62, and the optical fiber FB5.

On the other hand, the reference light L2 enters the optical path length adjustment device 66 through the optical fiber FB3, the optical circulator 64, and the optical fiber FB6. The reference light L2 whose optical path length has been adjusted by the optical path length adjustment device 66 is guided through the optical fiber FB6, the optical circulator 64, the polarization controller 78, and the optical fiber FB7 to enter the combining device 58.

The reflected light L3 and the reference light L2 are combined in the combining device 58. The interference light L4 between the combined reflected light L3 and reference light L2 is branched in the combining device 58 (the light branching device 59), and the interference light L4a and interference light L4b are respectively emitted into the optical fibers FB8 and FB9. The interference light L4a and interference light L4b respectively guided through the optical fibers FB8 and FB9 are detected by balanced detection by the interference signal acquiring device 60.

The interference light L4 detected by balanced detection by the interference signal acquiring device 60 is output as the interference signal to the A/D conversion and data storage section 22. The interference signal is then A/D converted in the A/D conversion and data storage section 22.

The signal and image processing section 24 performs signal conversion processing on the interference signals corresponding to a single line such that the interference signals are at regular intervals with respect to a wavenumber k. After that, spectral analysis is performed on the interference signals to acquire tomographic data (reflectance) respectively from the interference signals as tomographic data. The acquired tomographic data is accumulated for n lines in the scanning direction (the direction of the arrow R1) of the measurement light L1.

When the rotation clock signal from the probe scanner 14 is detected, one optical tomographic image is generated by using the accumulated plurality of pieces of tomographic data. The image quality of the generated optical tomographic image is corrected, and the optical tomographic image whose image quality has been corrected is displayed on the image display section 26 in FIG. 1.

[Description of Zero-Path Adjustment]

Next, the zero-path adjustment for adjusting the optical tomographic image reference position as the reference to acquire the optical tomographic image in the aforementioned optical tomographic image acquisition apparatus 1 will be described. The flowing zero-path adjustment can be performed during measurement as well as when the optical probe 10 is replaced or the optical tomographic image acquisition apparatus 1 is started up.

Figure 5A:
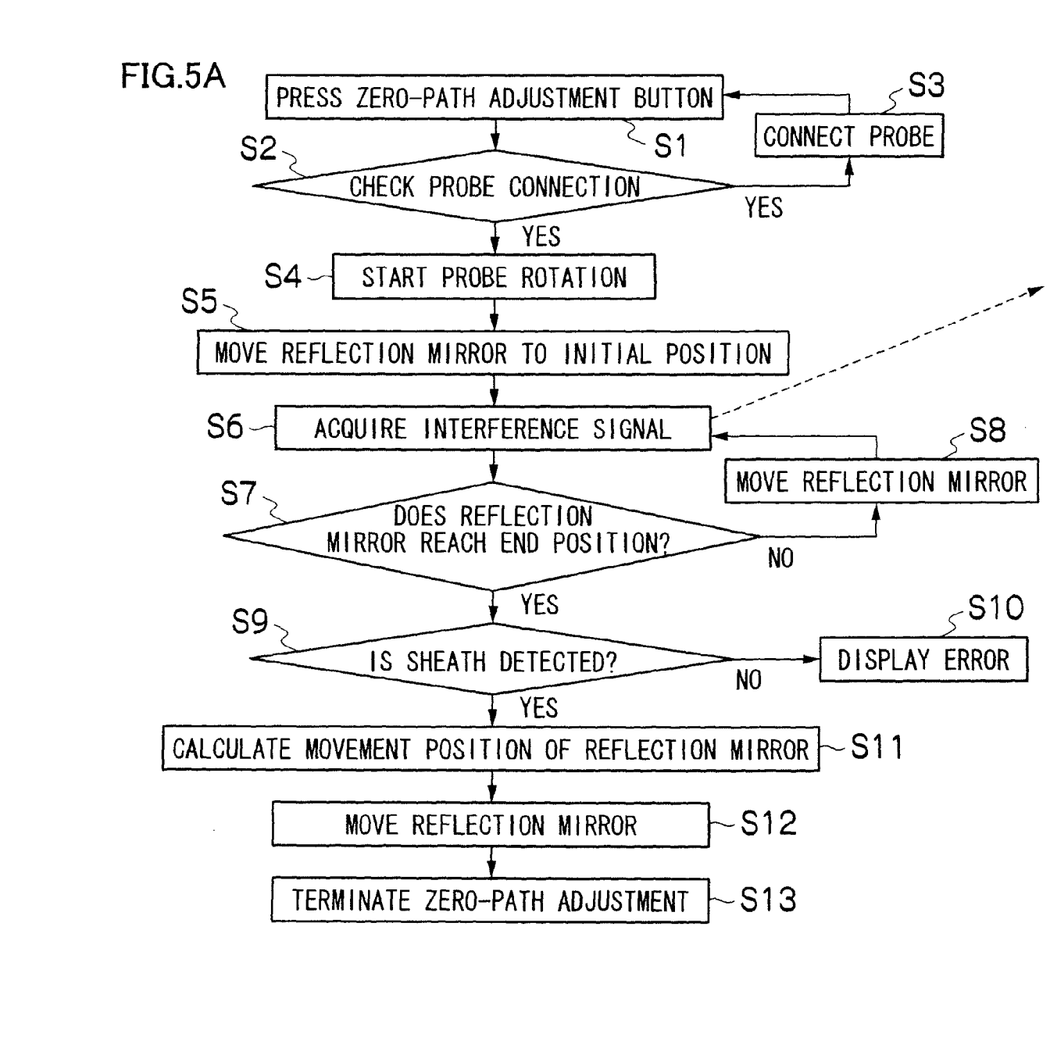
FIGS. 5A and 5B are a flowchart of zero-path adjustment according to the present invention and a graph of an acquired interference signal.

FIG. 5A is a flowchart of the zero-path adjustment according to the present invention. As shown in FIG. 5A, first, a zero-path adjustment button (not shown) arranged on the operation section of the apparatus is pressed (step S1).

It is checked whether the optical probe 10 is connected to the rotary adapter 12 (step S2). When the optical probe 10 is not connected to the rotary adapter 12, the optical probe 10 is connected thereto (step S3), and the zero-path adjustment button is pressed (step S1).

On the other hand, when the optical probe 10 is connected to the rotary adapter 12 in step S2, the rotation operation of the optical probe 10 is started (step S4).

Subsequently, the reflection mirror 74 of the optical path length fine adjustment device 70 as a delay device is moved to an initial position (step S5). An interference signal at the initial position is detected by the interference signal acquiring device 60 (step S6). A memory (not shown) may store the position of the reflection mirror 74 after the previous zero-path adjustment, to employ a position apart a predetermined distance from the stored position of the reflection mirror 74 as the initial position.

Figure 5B:
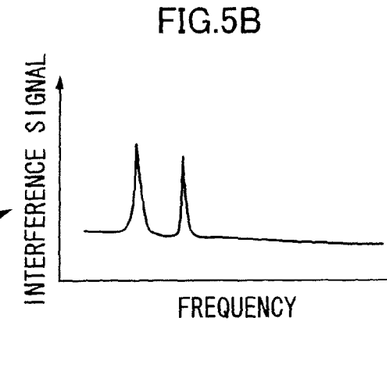

The interference signal as shown in FIG. 5B in which the horizontal axis represents the frequency (depth) of the interference light and the vertical axis represents the value of the interference signal is acquired here. As shown in FIG. 5B, the interference signal has two peak values at given frequencies (given depths) within a measurable area.

However, the interference signal may have a peak value due to reflected light from the optical lens 34 in the optical probe 10, or reflected light within a body cavity when the optical probe 10 is inserted into the body cavity, for example.

Thus, at this point in time, it is not clear whether the two peak values of the interference signal are caused by an interference signal of reflected light from an inner peripheral surface 30a and an outer peripheral surface 30b of the sheath 30.

In the following steps, it is determined whether the two peak values of the interference signal are caused by the interference signal of the reflected light from the inner peripheral surface 30a and the outer peripheral surface 30b of the sheath 30, that is, whether the sheath 30 is detected within the measurable area.

First, the interference signal acquiring device 60 acquires the interference signals while moving the reflection mirror 74 from the initial position. It is then checked whether the reflection mirror 74 has been moved to a predetermined end position (step S7). When the reflection mirror 74 has not reached the predetermined end position, the reflection mirror 74 is further moved (step S8). The reflection mirror 74 is continuously or intermittently moved. Alternatively, the reflection mirror 74 may be moved with large steps to a position where the interference signal can be acquired, and then, moved with small steps.

Subsequently, when the reflection mirror 74 has reached the predetermined end position, it is determined whether the sheath 30 is detected within the measurable area by using the interference signals acquired with the reflection mirror 74 being moved (step S9). A specific determination method will be described below.

Figure 6:
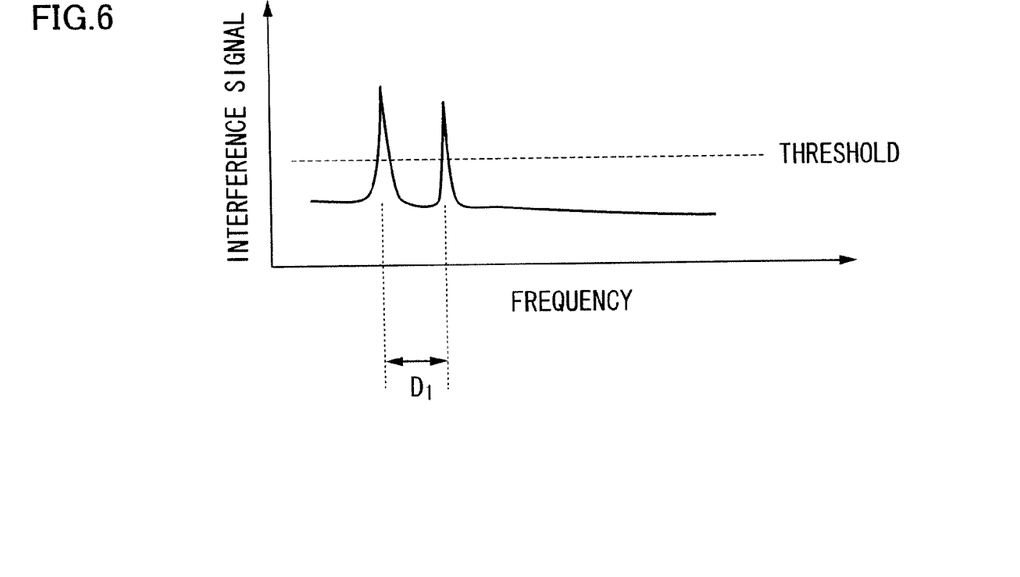
FIG. 6 illustrates a method of determining whether a sheath is detected within a measurable area by using an interference signal.

FIG. 6 illustrates a method of determining whether the sheath 30 is detected within the measurable area by using the interference signals.

As shown in FIG. 6, first, the interference signal is cut off at a predetermined threshold, and the cut-off peak values of the interference signal are detected. Here, two peak values of the interference signal are detected. One of the peak values selected from the two peak values of the interference signal is detected. It is then detected whether the second peak value exists at a frequency apart by a width D1 corresponding to the thickness of the sheath 30 (a distance between the inner peripheral surface 30a and the outer peripheral surface 30b) from the frequency at which the first peak value is detected.

When the second peak value is detected to exist at the above frequency, the two peak values of the interference signal are highly likely to be the values of the interference signal of the reflected light from the inner peripheral surface 30a and the outer peripheral surface 30b of the sheath 30.

By further checking a state of movement of the reflection mirror 74 and shift of the interference signal, it is finally determined whether the sheath 30 is detected within the measurable area.

To be more specific, it is determined as described below.

Figure 7A:
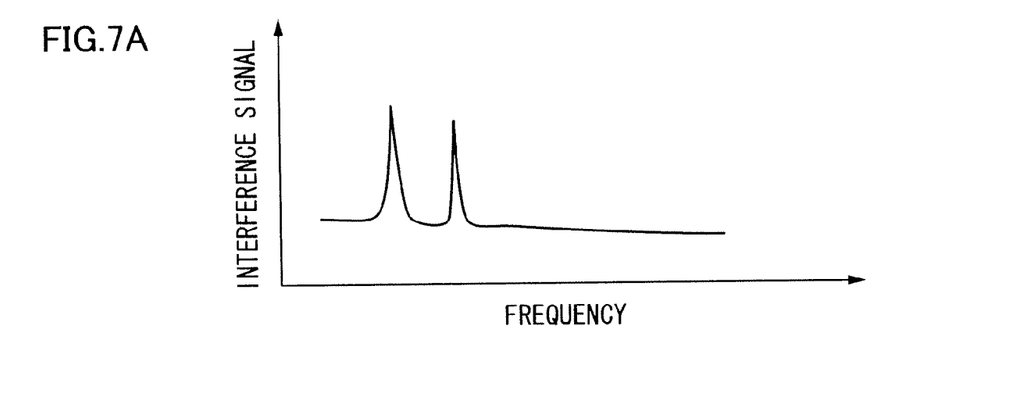
FIGS. 7A and 7B illustrate a state of shift of an interference signal when a reflection mirror is moved.
Figure 7B:
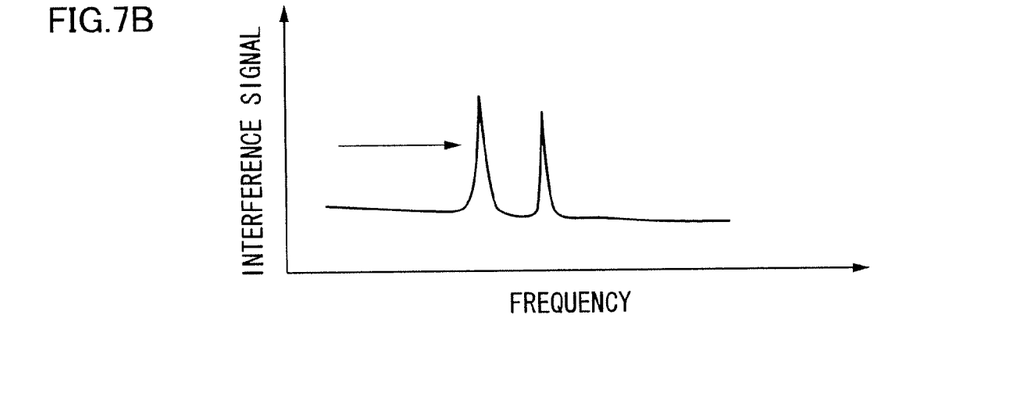

FIGS. 7A and 7B illustrate the state of shift of the interference signal when the reflection mirror 74 is moved.

In a case where the two peak values of the interference signal shown in FIG. 7A are caused by the interference signal of the reflected light from the inner peripheral surface 30a and the outer peripheral surface 30b of the sheath 30, the two peak values of the interference signal are shifted in a direction in which the frequency becomes higher as shown in FIG. 7B when the reflection mirror 74 is moved from the initial position to the predetermined end position in a direction in which the reference light L2 has a longer optical path length.

Thus, when it is confirmed that the two peak values of the interference signal are shifted in the direction in which the frequency becomes higher as shown in FIG. 7B by moving the reflection mirror 74 from the initial position, it is determined that the two peak values of the interference signal are caused by the interference signal of the reflected light from the inner peripheral surface 30a and the outer peripheral surface 30b of the sheath 30.

Accordingly, the interference signal of the sheath 30 can be stably detected within the measurable area.

If the interference signal of the sheath 30 cannot be detected within the measurable area in step S9, an error is displayed on the display section arranged on the operation section of the apparatus (step S10).

When the interference signal of the sheath 30 can be detected within the measurable area in step S9, the position to which the reflection mirror 74 is to be moved is calculated such that the optical tomographic image reference position is set based on the position (frequency, depth) of the detected sheath 30 (step S11).

Following methods may be employed as a method of setting the optical tomographic image reference position based on the position of the detected sheath 30.

As a first method, a depth to be measured is represented by Z on the assumption that the object to be measured S contacts the outer peripheral surface 30b of the sheath 30. The position of the reflection mirror 74 is adjusted so as to acquire an interference signal having a high frequency at the outer peripheral surface 30b of the sheath 30 by setting the optical tomographic image reference position at a position apart a distance of Z from the outer peripheral surface 30b of the sheath 30.

A following expression is calculated when the frequency and the wavenumber at the outer peripheral surface 30b of the sheath 30 are respectively represented by f and k, for example.

$$f = \left(\frac{Z}{\pi}\right) \times \left(\frac{dk}{dt}\right)$$ [Expression 1]

As a specific example, when the sweep frequency of the light source is 20 kHz (a duty ratio: 65%), the sweep wavelength interval is 150 nm (a central wavelength: 1.31 μm), and Z is 3.4 mm, the position of the reflection mirror 74 is calculated and adjusted such that the frequency f at the outer peripheral surface 30b of the sheath 30 is 18.3 MHz. Accordingly, the optical tomographic image reference position is set at a position apart a distance of Z=3.4 mm from the outer peripheral surface 30b of the sheath 30.

In the first method, the frequency f at the outer peripheral surface 30b of the sheath 30 is preferably 15 MHz to 20 MHz.

As a second method, the position of the reflection mirror 74 is adjusted so as to acquire an interference signal having a low frequency at the outer peripheral surface 30b of the sheath 30 and an interference signal having a high frequency at a predetermined depth position of the object to be measured S by setting the optical tomographic image reference position at a position between the optical axis of the optical fiber 32 within the optical probe 10 and the inner peripheral surface 30a of the sheath 30.

A following expression is calculated when the distance between the optical axis of the optical fiber 32 and the inner peripheral surface 30a of the sheath 30 is represented by d and the optical tomographic image reference position is set at the position of the optical axis LP (see FIG. 2) of the optical fiber 32 in the optical probe 10, for example.

$$f = \left(\frac{(d/4)}{\pi}\right) \times \left(\frac{dk}{dt}\right)$$ [Expression 2]

As a specific example, when the sweep frequency of the light source is 20 kHz (a duty ratio: 65%) and the sweep wavelength interval is 150 nm (a central wavelength: 1.31 μm) in a similar manner to the above on the assumption that d is 1.25 mm, the position of the reflection mirror 74 is calculated and adjusted such that the frequency f at the outer peripheral surface 30b of the sheath 30 is 6.75 MHz. Accordingly, the optical tomographic image reference position is set at the position of the optical axis LP of the optical fiber 32 in the optical probe 10.

In the second method, the frequency f at the outer peripheral surface 30b of the sheath 30 is preferably 3 MHz to 8 MHz.

As the method of setting the optical tomographic image reference position based on the detected position of the sheath 30, the optical tomographic image reference position may be also set by manually inputting the frequency f at the outer peripheral surface 30b of the sheath 30 through an input device (such as a touch panel, not shown) other than by the calculation as described above.

Accordingly, the frequency f of the interference signal at the outer peripheral surface 30b of the sheath 30 can be freely changed by using the input device.

As the method of setting the optical tomographic image reference position based on the detected position of the sheath 30, the optical tomographic image reference position may be also set based on the frequency f at the outer peripheral surface 30b of the sheath 30 which is stored in a memory (not shown) in advance.

Although the optical tomographic image reference position is set based on the frequency f at the outer peripheral surface 30b of the sheath 30 in the present embodiment, the optical tomographic image reference position may be also set based on the frequency at the inner peripheral surface 30a of the sheath 30.

The methods described above are employed as the method of setting the optical tomographic image reference position based on the detected position of the sheath 30.

Subsequently, the reflection mirror 74 is moved to the movement position obtained as described above (step S12), and the zero-path adjustment is terminated (step S13).

As described above, in the present invention, the inner peripheral surface 30a and the outer peripheral surface 30b of the sheath 30 of the optical probe 10 can be stably detected within the measurable area. Accordingly, a zero-path position that is the optical tomographic image reference position as the reference to acquire the optical tomographic image can be reliably adjusted based on the detected position of the outer peripheral surface 30b of the sheath 30.

The optical tomographic image acquisition apparatus and the method of acquiring the optical tomographic image according to the present invention are described above in detail. However, it goes without saying that the present invention is not limited to the aforementioned embodiment and various modifications and changes may be made therein without departing from the scope of the present invention.

What is claimed is:

1. An optical tomographic image acquisition apparatus, comprising:
   a light source unit which emits light;
   a light dividing device which divides the light emitted from the light source unit into measurement light and reference light;
   a projecting device which is arranged inside a tubular sheath having translucency to project the measurement light divided by the light dividing device onto an object to be measured outside the sheath;
   a combining device which combines reflected light reflected from the object to be measured and the sheath and the reference light;
   an interference signal acquiring device which detects interference light between the reflected light and the reference light combined by the combining device and acquires the interference light as an interference signal;
   a signal and image processing section which acquires a tomographic information for generating an optical tomographic image at each scanning position of the object to be measured by performing signal processing of the interference signal acquired by the interference signal acquiring device;
   an optical path length adjustment device which comprises a reflection member capable of reflecting the reference light and adjusts an optical path length of the reference light by moving the reflection member in an optical axis direction of the reference light; and a zero-path adjustment section which controls a position of a reflection member such that the interference signal acquired by the interference signal acquiring device becomes a predetermined frequency.

2. The optical tomographic image acquisition apparatus according to claim 1, wherein the
the zero-path adjustment section controls a position of the reflection member based on a change of the interference signal acquired with the interference signal acquiring device when the reflection member is moved in a light axis direction of the reference light.

3. The optical tomographic image acquisition apparatus according to claim 2,
wherein the zero-path adjustment section controls a position of the reflection member based on a peak value of the interference signal acquired with the interference signal acquiring device when the reflection member is moved in the light axis direction of the reference light.

4. A method of acquiring an optical tomographic image, said method comprising:

dividing light emitted from a light source unit into measurement light and reference light;

projecting the measurement light onto an object to be measured outside a tubular sheath having translucency by a projecting device arranged inside the sheath;

combining reflected light reflected from the object to be measured and the sheath and the reference light;

acquiring interference light between the reflected light and the reference light that is combined as an interference signal;

acquiring a tomographic information for generating an optical tomographic image at each scanning position of the object to be measured by performing signal processing of the acquired interference signal;

adjusting an optical path length of the reference light by moving a reflection member capable of reflecting the reference light in an optical axis direction of the reference light; and controlling a position of the reflection member such that the acquired interference signal becomes a predetermined frequency.

* * * * *